(12) United States Patent
DeLuca

(10) Patent No.: US 8,589,342 B2
(45) Date of Patent: Nov. 19, 2013

(54) LOG MESSAGE OPTIMIZATION TO IGNORE OR IDENTIFY REDUNDANT LOG MESSAGES

(75) Inventor: Lisa Seacat DeLuca, San Francisco, CA (US)

(73) Assignee: International Business Machines Corporation, Armonk, NY (US)

(*) Notice: Subject to any disclaimer, the term of this patent is extended or adjusted under 35 U.S.C. 154(b) by 17 days.

(21) Appl. No.: 13/235,069

(22) Filed: Sep. 16, 2011

(65) Prior Publication Data

US 2013/0073526 A1  Mar. 21, 2013

(51) Int. Cl.
*G06F 17/00*  (2006.01)

(52) U.S. Cl.
USPC ........... 707/610; 707/713; 707/722; 707/736; 707/758; 707/781

(58) Field of Classification Search
USPC ................................................ 707/600–899
See application file for complete search history.

(56) References Cited

U.S. PATENT DOCUMENTS

| | | | |
|---|---|---|---|
| 5,513,317 A | 4/1996 | Borchardt et al. | |
| 7,120,685 B2 | 10/2006 | Ullmann et al. | |
| 7,689,973 B2 | 3/2010 | Kwong et al. | |
| 7,778,979 B2 | 8/2010 | Hatonen et al. | |
| 2008/0172652 A1 | 7/2008 | Davia et al. | |
| 2010/0082530 A1* | 4/2010 | Miyamoto | 707/609 |
| 2010/0217578 A1 | 8/2010 | Qin et al. | |

FOREIGN PATENT DOCUMENTS

| | | |
|---|---|---|
| CA | 2126006 A1 | 12/1994 |
| EP | 974093 B1 | 1/2000 |
| EP | 2141599 A2 | 1/2010 |
| JP | 2001175510 A | 6/2001 |

OTHER PUBLICATIONS

Hamou-Lhadj, A., et al. "Compression techniques to simplify the analysis of large execution traces," Proc. of the 10th Int'l. Workshop on Program Comprehension, 2002, pp. 159-168.
Hamou-Lhadj, A, et al., "Challenges and Requirements for an Effective Trace Exploration Tool," Proc of the 12th Int'l Workshop on Program Comprehension (IWPC '04) Jun. 24-26, 2004, pp. 70.

* cited by examiner

*Primary Examiner* — Isaac M Woo
(74) *Attorney, Agent, or Firm* — Cuenot, Forsythe & Kim, LLC

(57) ABSTRACT

A method of presenting log messages during execution of a computer program. The method can include identifying at least a second log message set comprising information that is the same as information contained in a first log message set. The method can include determining to present the second log message set in a manner that indicates that the second log message set is redundant, and presenting such list of log messages accordingly, or determining not to present the second log message set in the list of log messages, and presenting the list of log messages accordingly.

16 Claims, 3 Drawing Sheets

500

Identify at least a second set of a log messages comprising information that is the same as information contained in a first set of the log messages
502

↓

Determine to present the second log message set in a list of log messages in a manner that indicates that the second log message set is redundant
504

↓

Present the list of log messages, the list of log messages comprising at least the first log message set and excluding the second log message set
506

200

| O. | E | Data CenterR... | There was an exemption with the JSON: Value > ... | 205 |
| O. | W | System Err | org.json.JSONEsemption: Value <|DOCTYPE... | |
| O. | W | System Err | at org.json.JSONEsemption: Type... | |
| O. | W | System Err | at org.json.JSONObject: <init> ... | |

.
.
.

| O. | E | Data CenterR... | *There was an exemption with the JSON: Value > ...* | 210 |
| O. | W | System Err | *org.json.JSONEsemption: Value <|DOCTYPE...* | |
| O. | W | System Err | *at org.json.JSONEsemption: Type...* | |
| O. | W | System Err | *at org.json.JSONObject: <init> ...* | |

| O. | E | Data CenterR... | There was an exemption with the JSON: Value > ... | 305 |
| O. | W | System Err | org.json.JSONEsemption: Value <|DOCTYPE... | |
| O. | W | System Err | at org.json.JSONEsemption: Type... | |
| O. | W | System Err | at org.json.JSONObject: <init> ... | |

Additional sets of these log messages have been generated. ← 315

.
.
. 310

Redundant error messages ←

Identify at least a second log message set comprising information that is the same as information contained in a first log message set
402

Determine to present the second log message set in a list of log messages in a manner that indicates that the second log message set is redundant
404

Present the list of log messages, the list of log messages comprising at least the first log message set and indicating that the second log message set is redundant
406

Identify at least a second set of a log messages comprising information that is the same as information contained in a first set of the log messages
502

Determine to present the second log message set in a list of log messages in a manner that indicates that the second log message set is redundant
504

Present the list of log messages, the list of log messages comprising at least the first log message set and excluding the second log message set
506

FIG. 5

LOG MESSAGE OPTIMIZATION TO IGNORE OR IDENTIFY REDUNDANT LOG MESSAGES

BACKGROUND

One or more embodiments disclosed within this specification relate to the presentation of log messages generated during software development.

The monitoring of trace and console output commonly is performed by software developers and testers. A number of software tools are available to generate trace to aid in the monitoring, for example within integrated development environment (IDE) packages. Trace log messages typically relate to recorded information about a programs execution, which may be reviewed by developers and testers to diagnose software problems. Trace log messages can indicate low level information, such as exceptions, which are generated during the execution of a program. Trace log messages also can indicate high level information, such as status information or results related to a computer program's execution, which are generated during execution of a program. Sometimes, trace log messages presented within a view of an IDE are referred to as console log messages.

BRIEF SUMMARY

One or more embodiments disclosed within this specification relate to log message optimization.

An embodiment can include a method of presenting log messages during an execution of a computer program. The method can include identifying at least a second log message set comprising information that is the same as information contained in a first log message set. The method further can include determining to present the second log message set in a list of log messages in a manner that indicates that the second log message set is redundant, and presenting the list of log messages. The list of log messages can include at least the first log message set and indicate that the second log message set is redundant.

Another embodiment of the present invention can include another method of presenting log messages during an execution of a computer program. This method can include identifying at least a second log message set including information that is the same as information contained in a first log message set. The method further can include determining to not present the second log message set in a list of log messages. Further, the method can include presenting the list of log messages, the list of log messages including at least the first log message set and excluding the second log message set.

Another embodiment can include a computer program product for presenting log messages during execution of a computer program, the computer program product comprising computer-readable program code configured to perform the various steps and/or functions disclosed within this specification.

BRIEF DESCRIPTION OF THE SEVERAL VIEWS OF THE DRAWINGS

FIG. 2 is a log message list in accordance with one embodiment of the present invention.

FIG. 3 is a log message list in accordance with another embodiment of the present invention.

FIG. 4 is a flow chart illustrating a method of presenting log messages in accordance with another embodiment of the present invention.

FIG. 5 is a flow chart illustrating a method of presenting log messages in accordance with another embodiment of the present invention.

DETAILED DESCRIPTION

Figure 1:
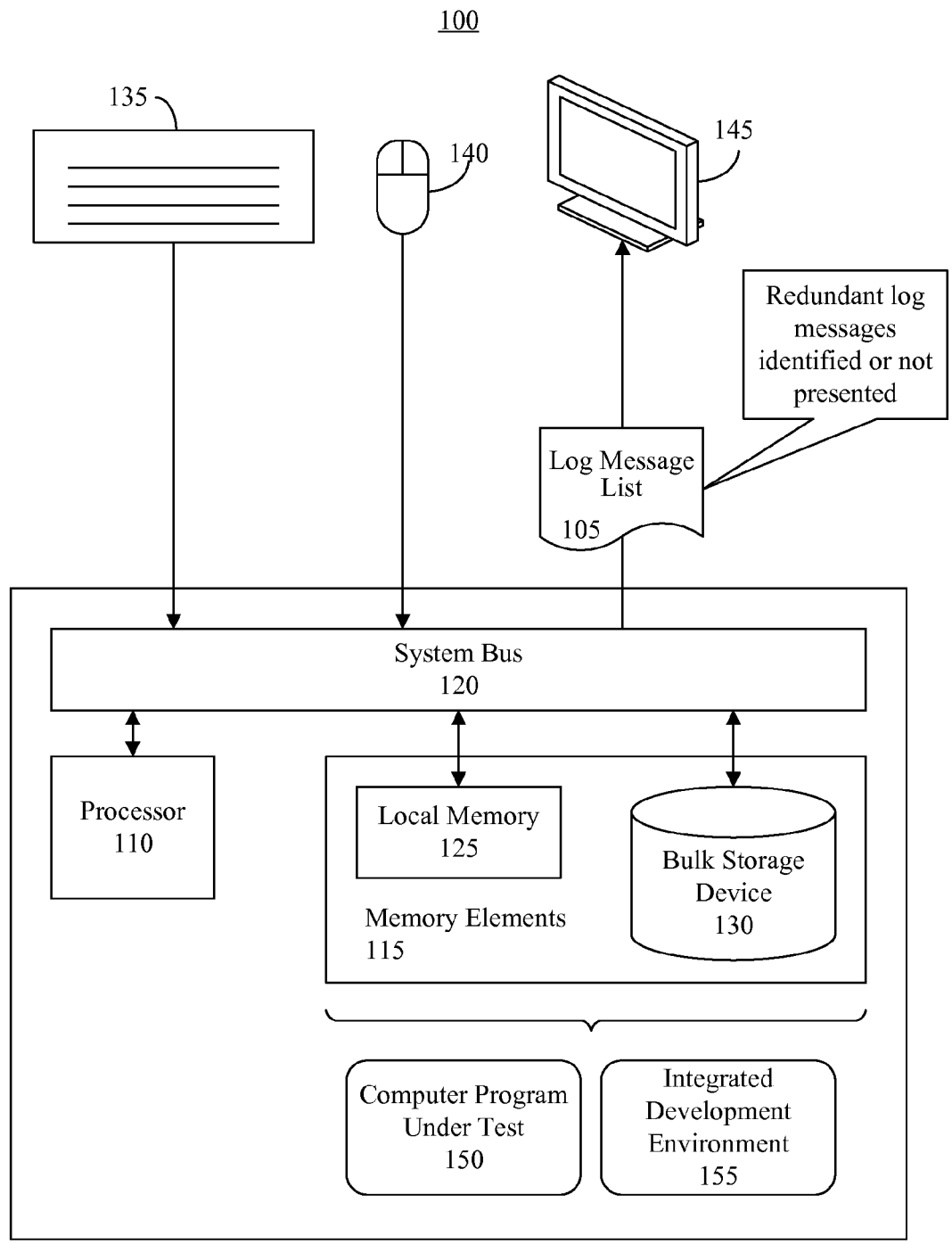
FIG. 1 is a block diagram illustrating a system for presenting log messages in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagram of methods, apparatus (systems), and computer program products according to embodiments of the invention. It will be understood that each block of the flowchart illustrations and/or block diagram, and combinations of blocks in the flowchart illustrations and/or block diagram, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention relates to identifying redundant log messages within a log message list. The redundant log messages can be hidden from view, or presented with one or more visual effects that distinguish the redundant log messages from other log messages presented in the log message list or subsequent log message lists generated for the same computer program under test. Accordingly, the present invention simplifies the process of debugging software being analyzed or tested.

FIG. 1 is a block diagram illustrating a system 100 for presenting log messages in accordance with one embodiment of the present invention. The log messages can include a trace log message entry, or any other message entries made during installation or execution of a computer program. As used herein, a trace log entry is an entry automatically made into a trace log or presented in a view, for example by a computer program executed by a processor, that indicates information related to a computer program's execution or installation. Hereinafter, trace log messages will be referred to as "log messages."

The system 100 can include at least one processor 110 coupled to memory elements 115 through a system bus 120. As such, the system 100 can store program code within the memory elements 115. The processor 110 can execute the program code accessed from the memory elements 115 via the system bus 120. In one aspect, for example, the system 100 can be implemented as computer that is suitable for storing and/or executing program code. It should be appreciated, however, that the system 100 can be implemented in the form of any system comprising a processor and memory that is capable of performing the functions described within this specification.

The memory elements 115 can include one or more physical memory devices such as, for example, local memory 125 and one or more bulk storage devices 130. Local memory 125 refers to random access memory or other non-persistent memory device(s) generally used during actual execution of the program code. The bulk storage device(s) 130 can be implemented as one or more hard disk drives (HDDs), one or more solid state drives (SSDs), and/or other persistent data storage device. The system 100 also can include one or more cache memories (not shown) that provide temporary storage of at least some program code in order to reduce the number of times program code must be retrieved from the bulk storage device 130 during execution.

Input/output (I/O) devices such as a keyboard 135, a pointing device 140, a display 145, and one or more printers (not shown) optionally can be coupled to the system 100. The I/O devices can be coupled to the system 100 either directly or through intervening I/O controllers. Network adapters also can be coupled to the system 100 to enable the system 100 to become coupled to other systems, computer systems, remote printers, and/or remote storage devices through intervening private or public networks. Modems, cable modems, and Ethernet cards are examples of different types of network adapters that can be used with the system 100.

As pictured in FIG. 1, the memory elements 115 can store a computer program under test (CPUT) 150 and an integrated development environment (IDE) 155. The CPUT 150 and IDE 155, being implemented in the form of executable program code, can be executed by the system 100 (e.g., via the processor 110) to implement the processes and methods described herein. In one embodiment, the CPUT 150 can be instrumented with computer program code configured to generate log messages corresponding to execution of the CPUT 150. Further, the IDE 155 can include computer program code to monitor installation and/or execution of the CPUT 150. In one embodiment, the computer program code instrumented into the CPUT 150 and/or the computer program that monitors installation and/or execution of the CPUT 150 can be configured to generate log messages relating such installation and/or execution of the CPUT 150. In addition to, or in lieu of, the computer program code instrumented into the CPUT 150, the CPUT 150 and/or the IDE 155 can include native program code that generates log messages relating such installation and/or execution of the CPUT 150.

In operation, the CPUT 150 can be executed by and/or installed on the system 100, for example during software development, and the IDE 155 can monitor the execution and/or installation of the CPUT 150. During the execution and/or installation of the CPUT 150, the CPUT 150 and or the IDE 155, either through native computer program code or instrumented program code, can generate log messages. The log messages can be recorded to the memory elements 115, for example into one or more files. The file(s) can cumulate the log messages in any suitable manner, for example within one or more data tables or other suitable data structures configured to store the log messages. The files can be embodied as HTML files, XML files, or in any other suitable file format.

The accumulated log messages can be presented to a user in a log message list 105. The log message list 105 can be presented in a view of the IDE 155, presented in view of an operating system independent of the IDE 155, or presented in another suitable manner. For example, the log message list 105 can be output to the display 145 for presentation to the user via the display 145 (e.g., presented within the IDE 155 or in another suitable manner), output to a printer for presentation to the user via a printout, or the like. In one aspect, the log message list 105 can be output to, and stored within, the memory elements 115, and the log message list can be accessed from the memory elements 115 when the log message list 105 is to be presented. In this regard, "outputting" and/or "output" can mean storing in memory elements 115, for example, writing to a file stored in memory elements 115, writing to the display 145, a printer, or another peripheral output device, playing audible notifications, sending or transmitting to another system, exporting, or the like.

The log messages that are generated during execution and/or installation of the CPUT 150 can be reviewed to determine whether any sets of log messages are redundant. As used herein, a log message set includes one or more log messages. In accordance with this definition, a log message set can include a single (i.e., one) log message, or a log message set can include a plurality of (i.e., two or more) log messages.

In one arrangement, a user can review the log messages, and identify one or more sets of log messages which are redundant. For example, the user can identify redundant sets of log messages, for example by perusing the log message list 105, and select a button, icon or menu item in the IDE 155 to mark such sets of log messages as being redundant.

In another example, the user can access the source code for the CPUT 150 and indicate statements within the source code, such as debug statements, that are to be monitored for redundancy. Accordingly, redundant log messages generated by the statements can be handled as being redundant. In illustration, the user can mark the statements to be monitored for redundancy. The IDE can be configured to recognize the alphanumeric text and/or any other suitable symbols as indicating that the statements are redundant. Moreover, the user can specify a threshold number of times that a corresponding log message may be presented. The threshold value can be 0, 1, 2, 3, or any other value.

For example, assume the source code contains a statement System.out.println("hello world"). The user can mark such statement to only output "hello world" a threshold number of times. In illustration, if the user marks the statement to only be output three (3) times, the first three times the statement is encountered, log message "hello world" can be output. The log message can be output by the IDE 155, a server, or any other suitable application. Any subsequent times the statement is encountered, the statement can be identified as being redundant. Thus, the subsequent times the output "hello world" is generated the output "hello world" can be presented with at least one visual effect that visually distinguishes "hello world" from other log messages in the log message list, or an identifier can be output in lieu of "hello world" for presentation in the log message list. For example, an identifier "redundant log message set—id 123" can be output. A portion of the identifier, for example "id 123," can identify the statement for which the identifier was generated. In another embodiment, when the output "hello world" is generated more times than the threshold value, these subsequent outputs can be excluded from the log message list.

In another embodiment, the system 100 can identify one or more sets of redundant log messages. In illustration, the system 100 can identify as being redundant at least one log message set comprising information that is the same as information contained in one or more other sets of log messages, for example log messages contained earlier in the log message list 105. In illustration, a global preference can be set that indicates a first threshold value for a size of the set of redundant log messages. The size can, for example, correspond to a number of log messages. When a second log message set contains the same information as at least a first log message set, and the size of the second log message set at least equals the first threshold value, a determination can be automatically made by the system 100 to identify the second log message set as redundant. When a size of the second log message set does not at least equal the first threshold value, a determination can be automatically made by the system 100 not to identify the second log message set as redundant. As used herein, the term "global reference" is defined as a setting in an application, such as the IDE 155. Such setting can be user selected, selected by an administrator, or provided as a default setting.

Further, a global preference can be set that indicates a second threshold value for a number of times that log messages are allowed to be repeated. For instance, the second threshold value can be set to be two or more. In illustration, if the second threshold value is set to three, a first and a second log message set containing the same information contained in other sets of log messages need not be identified as being redundant, while other sets of log messages containing the same information can be identified as being redundant.

Regardless of whether the user or the system 100 identifies the redundant sets of log messages, the system 100 can identify, or not present, redundant sets of log messages in the log message list 105, or subsequent log message lists. Hereinafter, reference will be made to the log message list 105. It will be understood by those skilled in the art that description herein also may be applied to any subsequent log message lists generated by the system 100.

In one example, the system 100 can present a set of redundant log messages in the log message list 105 with one or more visual effects that visually distinguish the redundant log messages from other log messages presented in the list 105. In illustration, redundant log messages can be presented with a font different than a font used to present other log messages, presented with a font color different than a font color used to present other log messages, presented with a font size different than a font size used to present other log messages, presented with highlighting applied to the redundant log messages, or the like. In another embodiment, a visual effect can be applied to hide redundant log messages, for example by applying a font style, such as style="display none."

In another example, the system 100 can reduce a size of the log message list 105 by presenting an identifier in place of the redundant log messages, ignoring the redundant log messages (e.g., hiding or otherwise not displaying redundant log messages), or the like. In this regard, the system 100 can condense the amount of log message content through which a user must navigate while perusing the log message list 105. This condensed view of the log message list 105 can be generated in response to a user selection that indicates a condensed view of the log message list 105 is to be presented, or in response to identifying a global preference that indicates that the condensed view of the log message list 105 is to be presented. In illustration, a user selectable option can be presented within the IDE 155 to select a global preference that indicates that redundant sets of log messages are to be identified and/or not presented. In another embodiment, an icon, button, or other user selectable object can be presented within a view of the IDE 155 to indicate whether redundant sets of log messages are to be identified and/or not presented.

In one aspect, the system 100 can present within the log message list 105 an identifier, such as a message, icon or button. The identifier can indicate that a particular log message set presented in the list 105 comprises the same content as another log message set, and thus is redundant. The identifier can be presented in place of, or proximate to, the particular log message set within the log message list 105. The identifier can be user selectable, for example the identifier can be selected when the log message list 105 is presented on the display 145, or the identifier can be selected by an automated process. In another aspect, an identifier can be presented proximate to the first log message set in the log message list 105. Such identifier can indicate that a second log message set containing the same information as the first log message set has been generated. Again, the identifier can be user selectable when the log message list 105 is presented on the display 145, or selected by an automated process.

Regardless of whether an identifier is presented proximate to the first log message set or the second log message set, or an identifier is presented in place of the second log message set, selection of the identifier can cause the second log message set to be presented, cause an indication to be presented indicating where the second log message set is located, etc. For example, in response to a user selection of the identifier, an updated log message list 105 including the second set log messages can be presented via the display 145, presented via a printout generated by a printer or presented in another suitable manner. In another example, if a visual effect has been applied to hide redundant log messages, for example by applying a font style, such as style="display none," the identifier can be selected to change the font style to display the log messages. In illustration, the font style can be changed to style ="display:block."

In another example, the second log message set can be output to a file for redundant log messages. The file can be embodied as an HTML file, an XML file, or in any other suitable file format. Such file can be stored to the memory elements 115 or to another suitable location. When the indicator is selected, the file can be opened so as to present the second log message set, for instance via the display 145 or within a printout produced by a printer or the like.

FIG. 2 is a log message list 200 in accordance with one embodiment of the present invention. In the log message list 200, a first log message set 205 can be presented. In addition, a second log message set 210 comprising information that is the same as information contained in a first log message set 205 also can be presented. The second log message set 210, however, can be presented with an indication that the second log message set 210 is redundant to the first log message set 205. For example, the second log message set 210 can be presented with a font different than a font used to present the first log message set 205. In other embodiments, the fonts of the second log message set 210 can be presented in a different color that a font used to present the first log message set 205, the second log message set 210 can be presented with a font of different size than a font used to present the first log message set 205, the second log message set 210 can be presented with highlighting, etc.

FIG. 3 is a log message list 300 in accordance with another embodiment of the present invention. In the log message list 300, a first log message set 305 can be presented. In addition, an indicator 310 of a second log message set comprising information that is the same as information contained in a first log message set 305 also can be presented. The indicator 310 can be user selectable. When the indicator 310 is selected, the second log message set can be presented. Further, an indicator 315 can be presented with the first log message set 305 to indicate that at least one other log message set contains the same information as the first log message set 305, though this need not be the case. Again, the indicator 315 can be user selectable to present the second log message set.

FIG. 4 is a flow chart illustrating a method 400 of presenting log messages in accordance with another embodiment of the present invention. At step 402 at least a second log message set comprising information that is the same as information contained in a first log message set can be identified. In one embodiment, the second log message set can be identified by a user. For example, the user can peruse a log message list and select certain sets of log messages to indicate that such log messages are redundant. In another embodiment, the second log message set can be identified by a processing system, such as a processing system executing an IDE.

At step 404, a determination can be made to present the second log message set in a list of log messages in a manner that indicates that the second log message set is redundant. At step 406, the list of log messages can be presented. The list of log messages can comprise at least the first log message set and indicate that the second log message set is redundant. For example, the second log message set can be presented in a manner in which the second log message set is presented with at least one visual effect that visually distinguishes the second sent of log messages from the first log message set.

In another example, in place of the second log message set, within the list of log messages an identifier indicating that the second log message set is redundant can be presented. The identifier presented in place of the second log message set can indicate that the second log message set is redundant, and can be user selectable. In this regard, although the second log message set may not be initially presented, selection of the identifier can cause the second log message set to be presented in the list of log messages. In another example, proximate to the first or second sets of log messages within the list of log messages, an identifier indicating that the second log message set is redundant can be presented. Again, such identifier can be user selectable to cause the second log message set to be presented in the list of log messages.

FIG. 5 is a flow chart illustrating a method 400 of presenting log messages in accordance with another embodiment of the present invention. At step 502 at least a second log message set comprising information that is the same as information contained in a first log message set can be identified. In one embodiment, the second log message set can be identified by a user. For example, the user can peruse a log message list and select certain sets of log messages to indicate that such log messages are redundant. In another embodiment, the second log message set can be identified by a processing system, such as a processing system executing an IDE.

At step 504, a determination can be made to present the second log message set in a list of log messages in a manner that indicates that the second log message set is redundant. At step 506, a determination can be made not present the second log message set in a list of log messages. Such determination can be made upon a user selection or an automated process. At step 506, a list of log messages can be presented. The list of log messages can comprise at least the first log message set and can exclude the second log message set Like numbers have been used to refer to the same items throughout this specification. The flowcharts and block diagram in the Figures illustrate the architecture, functionality, and operation of possible implementations of systems, methods and computer program products according to various embodiments of the present invention. In this regard, each block in the flowchart or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustrations, and combinations of blocks in the block diagram and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of presenting log messages during execution of a computer program, the method comprising:
identifying at least a second log message set comprising information that is the same as information contained in a first log message set;
determining to present the second log message set in a list of log messages in a manner that indicates that the second log message set is redundant; and
presenting the list of log messages, the list of log messages comprising at least the first log message set and indicating that the second log message set is redundant, wherein
the determination not to present the second log message set in the list of log messages is made in response to a global preference that indicates that a condensed view of the list of log messages is to be presented,
the global preference indicates a threshold value for a size of the second list of log messages, and
determining not to present the second log message set in the list of log messages comprises identifying that the size of the second list of log messages at least equals the threshold value.

2. The method of claim 1, wherein indicating that the second log message set is redundant comprises:
presenting the second log message set with at least one visual effect that visually distinguishes the second log message set from the first log message set.

3. The method of claim 1, wherein indicating that the second log message set is redundant comprises:
in place of the second log message set, presenting within the list of log messages an identifier indicating that the second log message set is redundant.

4. The method of claim 3, wherein:
the identifier indicating that the second log message set is redundant is user selectable; and
selection of the identifier indicating that the second log message set is redundant causes the second log message set to be presented in the list of log messages.

5. The method of claim 3, further comprising:
presenting within the list of log messages an identifier indicating that the first log message set comprises the same content as the second log message set.

6. The method of claim 1, wherein identifying the second log message set comprises:
identifying the second log message set as corresponding to statements within source code of the computer program which have been indicated to monitor redundancy.

7. The method of claim 1, further comprising:
outputting the second log message set into a file for redundant log messages.

8. A method of presenting log messages during execution of a computer program, the method comprising:
identifying at least a second log message set comprising information that is the same as information contained in a first log message set;
determining to not present the second log message set in a list of log messages; and
presenting the list of log messages, the list of log messages comprising at least the first log message set and excluding the second log message set, wherein
the determination not to present the second log message set in the list of log messages is made in response to a global preference that indicates that a condensed view of the list of log messages is to be presented,
the global preference indicates a threshold value for a size of the second list of log messages, and
determining not to present the second log message set in the list of log messages comprises identifying that the size of the second list of log messages at least equals the threshold value.

9. A computer program product for presenting log messages during execution of a computer program, the computer program product comprising:
a computer-readable storage medium having computer-readable program code embodied therewith, the computer-readable program code comprising:
computer-readable program code configured to identify at least a second log message set comprising information that is the same as information contained in a first log message set;
computer-readable program code configured to determine to present the second log message set in a list of log messages in a manner that indicates that the second log message set is redundant; and
computer-readable program code configured to present the list of log messages, the list of log messages comprising at least the first log message set and indicating that the second log message set is redundant, wherein
the determination not to present the second log message set in the list of log messages is made in response to a global preference that indicates that a condensed view of the list of log messages is to be presented,
the global preference indicates a threshold value for a size of the second list of log messages, and determining not to present the second log message set in the list of log messages comprises identifying that the size of the second list of log messages at least equals the threshold value.

10. The computer program product of claim 9, wherein the computer-readable program code configured to indicate that the second log message set is redundant comprises:
   computer-readable program code configured to present the second log message set with at least one visual effect that visually distinguishes the second log message set from the first log message set.

11. The computer program product of claim 9, wherein the computer-readable program code configured to indicate that the second log message set is redundant comprises:
   computer-readable program code configured to, in place of the second log message set, present within the list of log messages an identifier indicating that the second log message set is redundant.

12. The computer program product of claim 11, wherein:
   the identifier indicating that the second log message set is redundant is user selectable; and
   selection of the identifier indicating that the second log message set is redundant causes the second log message set to be presented in the list of log messages.

13. The computer program product of claim 11, further comprising:
   computer-readable program code configured to present within the list of log messages an identifier indicating that the first log message set comprises the same content as the second log message set.

14. The computer program product of claim 9, wherein the computer-readable program code configured to identify at least the second log message set comprises:
   computer-readable program code configured to identify the second log message set as corresponding to statements within source code of the computer program which have been indicated to monitor redundancy.

15. The computer program product of claim 9, further comprising:
   computer-readable program code configured to output the second log message set into a file for redundant log messages.

16. A computer program product for presenting log messages during execution of a computer program, the computer program product comprising:
   a computer-readable storage medium having computer-readable program code embodied therewith, the computer-readable program code comprising:
   computer-readable program code configured to identify at least a second log message set comprising information that is the same as information contained in a first log message set;
   computer-readable program code configured to determine to not present the second log message set in a list of log messages; and
   computer-readable program code configured to present the list of log messages, the list of log messages comprising at least the first log message set and excluding the second log message set, wherein
   the determination not to present the second log message set in the list of log messages is made in response to a global preference that indicates that a condensed view of the list of log messages is to be presented,
   the global preference indicates a threshold value for a size of the second list of log messages, and
   determining not to present the second log message set in the list of log messages comprises identifying that the size of the second list of log messages at least equals the threshold value.

* * * * *